US007640956B2

(12) United States Patent
Arvidsson

(10) Patent No.: US 7,640,956 B2
(45) Date of Patent: Jan. 5, 2010

(54) FEED WHEEL

(75) Inventor: Hans Arvidsson, Grangärde (SE)

(73) Assignee: Log Max AB, Grangarde (SE)

( * ) Notice: Subject to any disclaimer, the term of this patent is extended or adjusted under 35 U.S.C. 154(b) by 12 days.

(21) Appl. No.: 11/961,309

(22) Filed: Dec. 20, 2007

(65) Prior Publication Data

US 2008/0156397 A1 Jul. 3, 2008

(30) Foreign Application Priority Data

Dec. 21, 2006 (SE) .................................... 0602772

(51) Int. Cl.
*B27B 31/00* (2006.01)
*A01B 29/04* (2006.01)

(52) U.S. Cl. ................... 144/246.1; 144/250.1; 492/30; 492/31

(58) Field of Classification Search .............. 144/246.1, 144/248.5–248.7, 250.1, 250.11, 246.2, 248.2; 492/28, 30, 31, 34, 36
See application file for complete search history.

(56) References Cited

U.S. PATENT DOCUMENTS

| | | | | |
|---|---|---|---|---|
| 344,069 | A * | 6/1886 | Vaughn | 69/37 |
| 2,588,121 | A * | 3/1952 | Johnston | 198/780 |
| 3,667,584 | A | 6/1972 | Karlsson | |
| 4,021,894 | A * | 5/1977 | Poterala et al. | 26/105 |
| 4,385,650 | A | 5/1983 | Schmidt | |
| 5,944,078 | A * | 8/1999 | Lindholm | 144/248.5 |
| 6,422,277 | B1 * | 7/2002 | Kube et al. | 144/246.1 |
| 6,453,959 | B1 * | 9/2002 | Johnson et al. | 144/246.1 |
| 2008/0115859 | A1 * | 5/2008 | Roy | 144/248.5 |

* cited by examiner

*Primary Examiner*—Shelley Self
(74) *Attorney, Agent, or Firm*—Renner, Otto, Boisselle & Sklar, LLP

(57) ABSTRACT

A feed wheel (10) for tree trunks, with rows of drive teeth (30) protruding from extended supports (20) united with a peripheral surface (18) of the wheel. In order to make the spaces between the supports (20) more self-clearing, supports (20) that are neighbours extend mutually divergently throughout the complete sideways direction of the peripheral surface (18) (at an angle $\alpha$).

6 Claims, 1 Drawing Sheet

FEED WHEEL

TECHNICAL AREA

The invention concerns a feed wheel for tree trunks, with rows of drive teeth protruding from extended supports united with a peripheral surface of the wheel.

BACKGROUND

A common problem with feed wheels for tree trunks is that bark and wood material from the trunks collects and becomes fixed to the periphery of the wheel in the spaces between the rows of drive teeth. The normally means that the depth of penetration of the drive teeth is reduced, such that the feed wheels acquire a poorer feed capacity, and this in turn means that the contact pressure of the feed wheels must be increased, leading to the wheels and tree trunks being subject to greater wear and damage. The accumulation of this material on the periphery of the rollers also causes their effective rolling diameter to vary in an unpredictable manner. If they are then used for the measurement of timber from processed tree trunks, as is common in, for example, single-grip harvesters, unreliable measurement results are obtained. It is thus strongly desired to prevent the accumulation of bark and wood material on the feed wheels.

Many attempts have been previously made to solve this problem. The teeth in one known type of feed wheel have such a large height that the accumulation of a certain amount of material on the wheels is permitted, and the self-cleaning properties of the tops of the teeth are relied on, in that the outermost layer of foreign material is relatively easily torn off from an underlying material layer. Such high teeth, however, can cause damage to the tree trunks. It is also known to make the supports spring-loaded against springs of, for example, a rubber material at the peripheral surface of the wheel, whereby the spring movements of the supports have a certain self-clearing influence on the collected bark and wood material. Such wheels, however, have relatively high maintenance costs due to the fact that the springs have a limited lifetime. The bases of the teeth in a further type of feed wheel are arranged elevated onto a plateau of the support above the periphery of the feed wheel. The plateau can be considered to be similar to a protective ring—such as that on a ski pole—that partially prevents the teeth sinking too deeply into the softer bark material, and in this way partially prevents the material falling down into the spaces between the supports.

DESCRIPTION OF THE INVENTION

One aim of the invention is to further develop a feed wheel of the type described in the introduction, based on the prior art technology, such that it achieves a greater degree of self-clearance.

This is achieved through the characteristics that are specified in the attached claims.

According to one examination of the invention, supports that are neighbours extend mutually divergently throughout the complete sideways direction on the peripheral surface.

In this manner, the spaces between the supports become so shaped that a release effect, or a positive angle of release in the sideways direction arises, that makes it more difficult for bark and wood residual to remain in place in these spaces.

Although other arrangements may be conceived, the supports in one embodiment of the invention are arranged on the peripheral surface in the form of a zig-zag pattern. In this way, all spaces around the wheel are limited by supports that diverge in a variety of directions in opposite sideways directions.

Furthermore, if, in a manner that is in itself known, the sides of the supports that are neighbours and that mutually face each other extend in a diverging radial manner outwards from the peripheral surface, then this release effect is further improved. The supports can be said in this case, in other words, to have a double-action release function.

If the limiting surfaces of the drive teeth in the normal manner extend around in a divergent radial manner inwards from the support surface, then all surfaces that interact with a tree trunk above the peripheral surface of the wheel obtain the desired self-clearing release function.

If furthermore, in the manner described above that is in itself known, a side of the supports that is turned radially outwards forms a support surface for the tree trunks at a distance from the peripheral surface, it can be ensured that bark and wood material is at least partially prevented from being pressed down into the spaces between the supports.

Extended bark and wood residuals that are oriented along the direction of the wood fibres and that are released from a tree trunk during feed, tending to get stuck to the wheel, and bent along a sequence of rows of teeth will be released relatively easily from teeth since their natural elasticity will strive to bend them back. Residuals that are short in a circumferential direction and extended in a sideways direction, and that are pressed down into the space between the supports, cannot use this self-clearing function as effectively. The spaces, which according to the invention are divergent in the sideways direction, then come into function instead, though the residuals, as soon as they are subject to a sideways force in the right direction from the wheel of the tree trunk, being released from their interaction with the sides of the supports and falling out from the space with the aid of centrifugal force when the spaces leave their interaction with the tree trunk during the rotation of the wheel. Such a perpendicular, sideways directed (component of a) force should arise with relatively high frequency when the wheel interacts with the uneven surface of a tree trunk. Within the scope of the invention according to the attached claims, it is also at least conceivable that such clearing sideways forces can be produced in other manners, such as, for example, through the wheel being caused to vibrate in a sideways direction, at least intermittently.

Other aims, characteristics and advantages of the invention are made clear by the claims and by the following descriptions of embodiments.

DETAILED DESCRIPTIONS OF EMBODIMENTS

Figure 1:
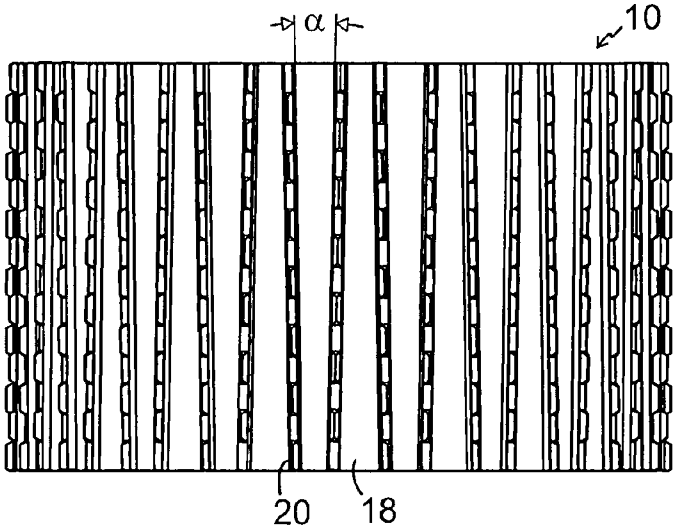
FIG. 1 is a side view of a feed wheel according to the invention.

The feed wheel 10 shown in the drawings is a typical feed wheel, intended to be used in a known manner as one of a pair for gripping and feeding tree trunks in a harvester, not shown in the drawings, of single-grip type. However, other applications can be conceived.

Figure 3:
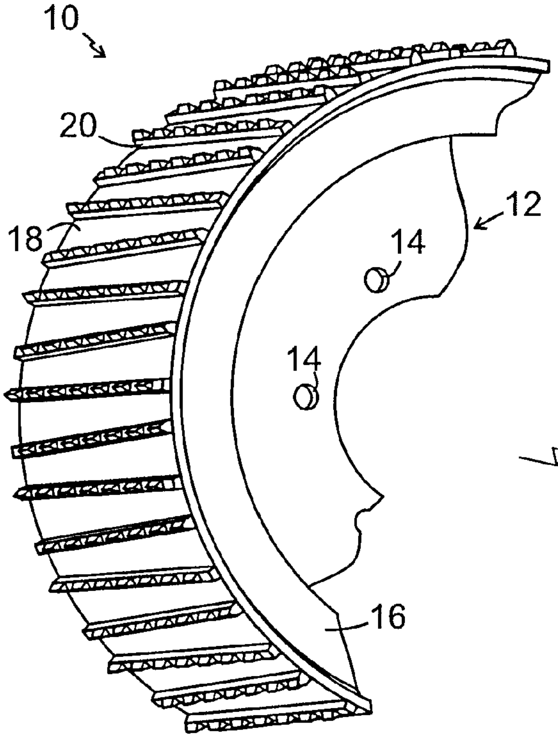
FIG. 3 is a view obliquely from the side of a feed wheel according to FIG. 1, with broken away parts.
Figure 4:
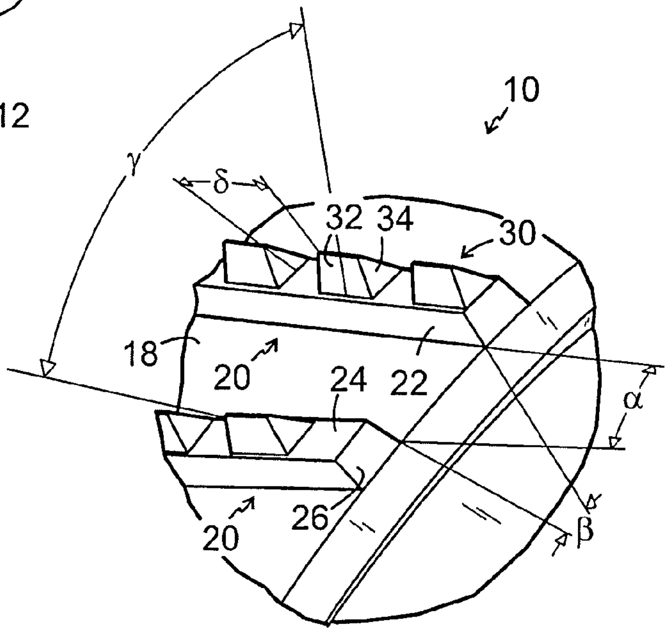
FIG. 4 is a view at a larger scale showing details of a broken away part of a feed wheel according to the invention.

The feed wheel 10 may be manufactured in one piece from, for example, steel, and it has an inner radial flange 12 with attachment holes 14 for attachment to a driving hub, also this not shown in the drawings, of the harvester. A radial flange 16 is also present at the two external surfaces of a peripheral surface 18 of the wheel 10 (only one such flange is shown in FIG. 3) that provides stiffness to the wheel 10.

The feed wheel 10 has rows of drive teeth 30 that are formed in one piece on extended supports 20 and protrude from these supports. The supports 20 are united with the peripheral surface 18 by, for example, welding. The upper surface of each support 20 forms a plateau or a support surface 24 that extends in the gaps between the drive teeth 30 and possibly also somewhat outside of these in the circumferential direction of the wheel 10.

According to the invention, neighbouring pairs of supports 20 extend mutually divergently throughout the complete sideways direction of the peripheral surface 18 with a positive angle (of release) α. The angle α can vary, and in the example shown it is approximately 2 degrees. To be more precise, the supports 20 extend is a screw-like manner with a large gradient, in a variety of directions on the peripheral surface 18. In this way, spaces that are essentially wedge-shaped in the sideways direction are formed between the supports 20 with a release function that facilitates release of bark and wood residual from the space in the manner that has been described in more detail above. The outer surfaces 26 of each support 20 that face away from each other (only one of which is shown in FIG. 3) can also, naturally, have a positive angle of release, that is, the outer surfaces then converge towards each other.

The inner surfaces 22, 22 of the supports 20 that face each other contain an angle β, which can lie between widely separated limits. In the example shown it is approximately 16 degrees. A release function is thus obtained in this manner in a direction that is radially outwards from the peripheral surface 18.

Figure 2:
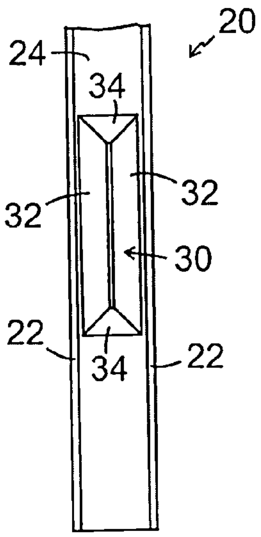
FIG. 2 is a view from above at a larger scale of a broken off part of a support of the feed wheel in FIG. 1, with a drive tooth.

Finally, the sides 32, 32 of the extended drive teeth 30 that are facing each other contain an angle γ in the circumferential direction, which also may lie between certain limits, but which in the example is approximately 60 degrees. The sides 34, 34 of the drive teeth 30 that are facing each other (FIG. 2) contain an angle δ in the axial direction, which in the example shown is, in a similar manner, also approximately 60 degrees.

The drive teeth 30 on adjacent supports 20 may be mutually displaced in a sideways direction, such that they overlap each other in the circumferential direction. The wheel 10 in this manner acquires a high feed capacity.

The detailed description given above is primarily intended to facilitate understanding: no limitations on the invention are to be derived from this description. The modifications that are obvious for one skilled in the arts when reviewing the description can be carried out without deviation from the innovative concept of the invention or the scope of the attached patent claims.

The invention claimed is:

1. A feed wheel for tree trunks, having a plurality of rows of drive teeth protruding from extended supports arranged circumferentially around a peripheral surface of the wheel, which wheel has an axis of rotation, wherein peripherally adjacent supports extend mutually divergently in a direction substantially parallel to the axis of rotation.

2. The feed wheel according to claim 1, whereby the supports are arranged around the peripheral surface in the form of a zig-zag pattern.

3. The feed wheel according to claim 1, wherein sides of the supports that are adjacent each other extend mutually divergently radially outwards from the peripheral surface.

4. The feed wheel according to claim 1, wherein external surfaces defining each drive teeth extend convergently in a radially outward direction from the support surface.

5. The feed wheel according to claim 1, wherein a radially outwardly facing side of each support forms a support surface for the tree trunks at a distance from the peripheral surface.

6. The feed wheel according to claim 1, wherein the drive teeth of adjacent supports are arranged mutually displaced in the direction substantially parallel to the axis of rotation, such that the drive teeth of adjacent supports overlap each other in the direction substantially parallel to the axis of rotation.

* * * * *